UNITED STATES PATENT OFFICE.

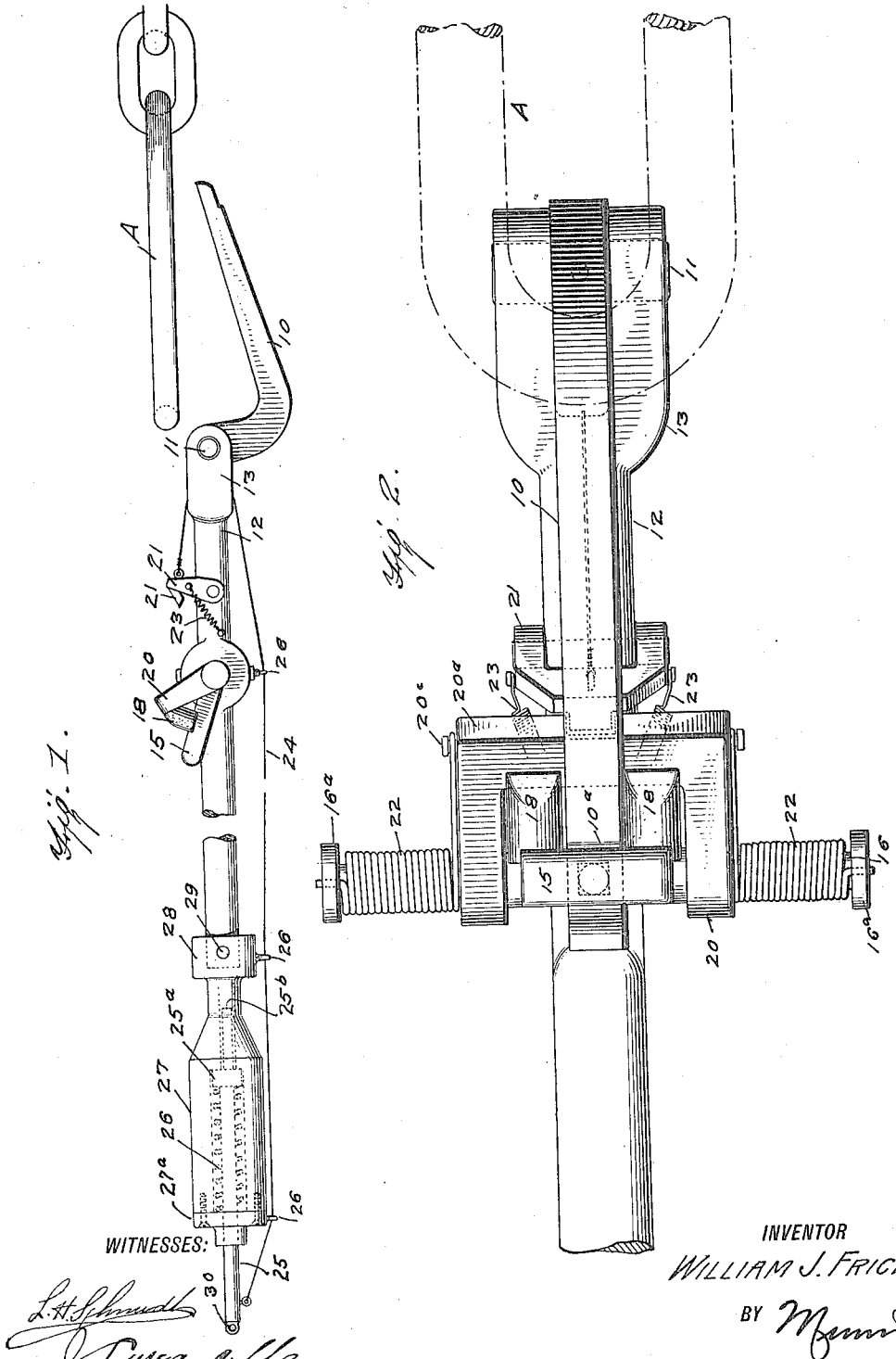

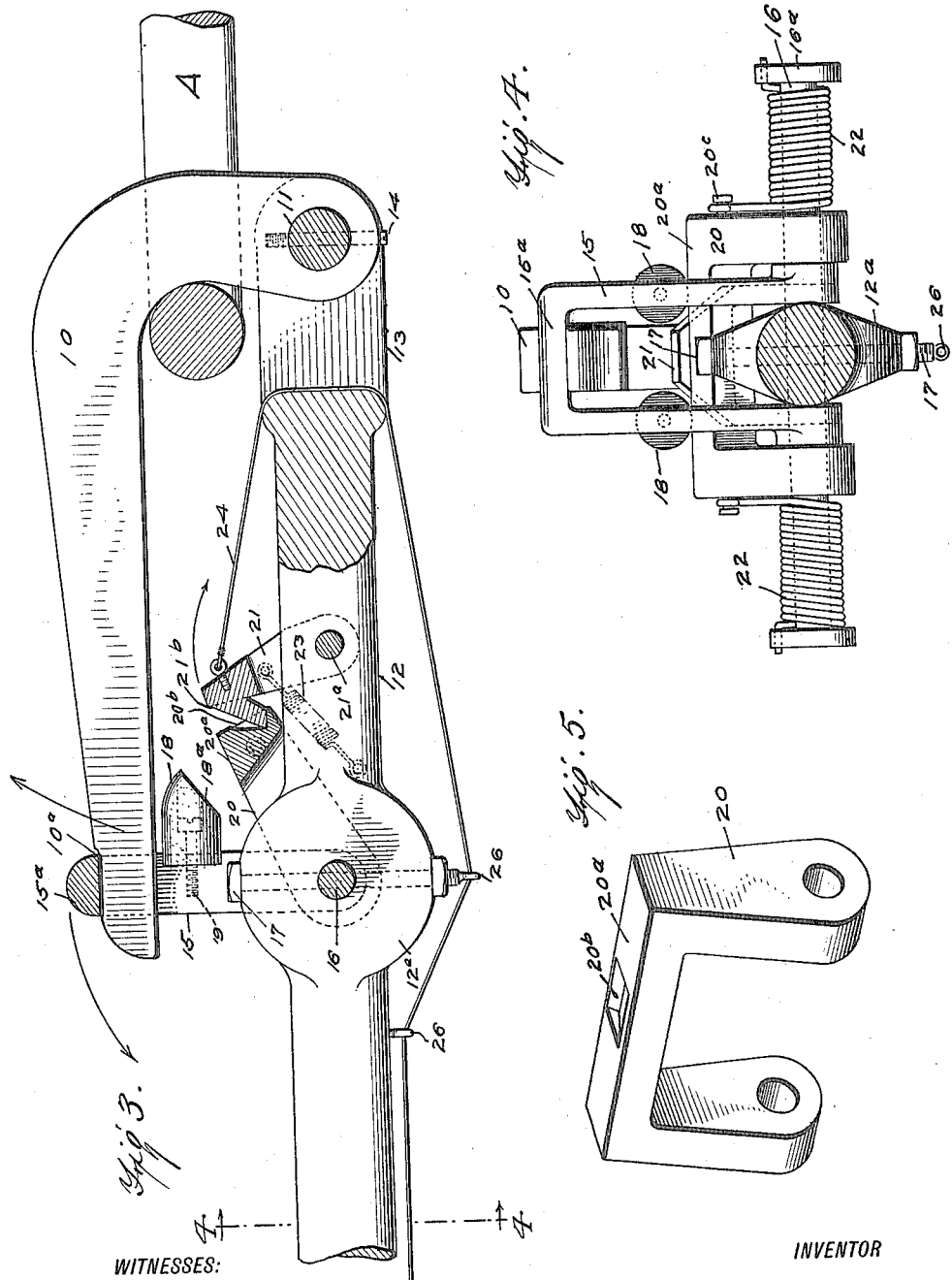

WILLIAM JOHN FRICKE, OF BELLINGHAM, WASHINGTON.

CHECK-UP HOOK.

1,164,491.  Specification of Letters Patent.  Patented Dec. 14, 1915.

Application filed April 17, 1915. Serial No. 22,026.

*To all whom it may concern:*

Be it known that I, WILLIAM J. FRICKE, a subject of the Emperor of Germany, and a resident of Bellingham, in the county of Whatcom and State of Washington, have invented a new and Improved Check-Up Hook, of which the following is a full, clear, and exact description.

My invention relates to devices known largely as check-up hooks, in the use of which a load, either suspended, or connected to be towed or hauled, is adapted to be released by the release or casting off of a pivoted hook by which the load is connected to the draft power or suspension means. Hooks of the indicated character, may be employed as a hitch device in towing a boat, in hauling a load, in suspending boats in davits, or for suspending a bomb from an aerial vessel, the arrangement being such that the load may be readily cast off in an emergency, as in towing a marine vessel, or a bomb may be released from an aerial vessel at the proper predetermined height for insuring the explosion of the bomb.

Prime objects of my invention are to provide a device of the indicated character having improved means to hold the hook in the engaged position; to insure the release of the hook when desired; and to guard against the accidental release of the hook.

Other objects and advantages of the invention will appear from the more particular description following.

Reference is had to the accompanying drawings forming part of this specification, in which similar characters of reference indicate corresponding parts in all the views, and in which.

Figure 1 is a side elevation of my improved hook; Fig. 2 is a partial front view on a larger scale; Fig. 3 is a partly sectional side elevation of the elements shown in Fig. 2; Fig. 4 is an end view of the bar forming the body or support of the hook, shown in cross section; and Fig. 5 is a perspective view of the releasing yoke bail.

In constructing my improved device, a hook 10 is secured to a pin 11 mounted to turn in a fork 13, which is formed at one end of an elongated shank or bar 12. A screw or pin 14 may be employed to secure the hook to the pin 11.

In order to hold the hook against pivotal movement in the fork 13, I provide a retainer in the form of a yoke bail 15 which is pivotally mounted on the shank 12 in a position to swing over the bill of the hook 10 or away from the hook to disengage the latter. In the construction shown a transverse pin 16 is secured to the shank, as by a bolt or pin 17, which pivotally mounts the side arms of the bail 15. The bill of the hook may have a shoulder $10^a$ engaged by the cross bar $15^a$ of the bail 15. Members 18 are provided on the bail 15, these being secured in the example shown by screws 19. Said members present beveled surfaces $18^a$ against which the side surface $20^a$ of a yoke 20 is adapted to contact. The said yoke is pivoted on the pin 16 and coil springs 22 are provided on the projecting ends of said pin. Each spring 22 is held at one end to a head $16^a$ on the pin 16 and the opposite end of the spring is connected with the yoke 20 as by pins $20^c$ on the latter.

The tendency of the springs 22 is to throw the yoke 20 against the beveled surface 18 of the bail 15 whereby to disengage the latter from the hook 10. In order to restrain the yoke 20 against movement by the springs 22, a latch 21 is pivotally mounted as by a pin $21^a$ on the shank 12 and has a nose $21^b$ adapted to engage in a depression $20^b$ in the yoke 20. The latch 21 is under the influence of retractile springs 23, each spring being secured at one end to a shank 12 and at the other end to the said latch.

In order to actuate the latch 21 against the tension of its springs 23 and release the yoke 20, a latch string 24 is connected with the said latch and extends from the same through the fork 13, the latch cord being returned and extended along the shank 12 toward the opposite end from the fork 13.

In order to connect the shank 12 with any suspension rope, tow rope, or haul rope, I provide a plunger 25 having an eye 30 at one end and a head $25^a$ operating in a cylinder 27 which is coupled to the shank 12. The connection between the cylinder 27 and the shank in the present example is by a socket 28 on the said cylinder and a fastening pin 29. The plunger 25 is under the influence of a compression spring 26 in the cylinder 27, said spring bearing at one end against the plunger head $25^a$ and at the opposite end against the cylinder head $27^a$. Suitable guide eyes 26 are provided on the shank 12 and on the cylinder 27 to guide the latch string 24.

By the described construction the suspension rope or haul rope is connected with the plunger 25 by the eye 30, the spring 26 serving to give a yielding connection and prevent shock. The load is represented here by a chain link A which is hitched to the hook 10 and the latter held by the bail 15. The latch cord 24 will extend in practice to any convenient point for manipulation, so that the load A may be released by a pull on the latch cord to free the hook 10 by disengaging the latch 21 whereby to release the yoke 20 and disengage the bail 15 from the hook. It will be seen that in the case of towing, the tow may be instantly released in an emergency by a pull on the latch string. Similarly, a bomb may be readily released from an aeroplane at any desired height to insure the explosion of the bomb. The device is capable of various applications, as for suspending boats in davits, or suspending and releasing other loads.

Having thus described my invention, what I claim as new and desire to secure by Letters Patent, is:

1. In a device of the character described, a shank, a hook pivotally secured to said shank to connect with a load, a retainer movably mounted on the shank to engage the hook or to disengage the same to release a load, a spring pressed element on the shank tending to disengage the retainer and release the hook, and a manually releasable latch for said spring pressed element.

2. In a device of the character described, a shank having means to connect it with power or suspension means, a hook pivotally mounted on the shank, a hook retainer in the form of a bail pivoted on the shank and movable to positions to engage the hook or to release the same, a spring pressed yoke pivoted on the shank and adapted to rock the bail to disengaged position, and latch means to hold the yoke against movement.

3. In a device of the character described, a shank having means to connect with power or suspension means, a hook pivotally mounted on the shank, a bail pivotally mounted on the shank to swing over the free end of the hook or to swing clear of the latter, said bail having a member presenting a beveled surface, a spring pressed element pivoted on the shank and movable into contact with said beveled surface to swing the bail to release the hook, and latch means to restrain said spring pressed element against movement.

4. In a device of the character described, a shank adapted to connect with draft or suspension means, said shank having a fork, a hook pivotally mounted in said fork, a bail pivotally mounted on the shank and adapted to engage and disengage the hook, a spring pressed yoke pivotally mounted on the shank in position to contact with the bail and swing the same to release the hook, said yoke having a cross bar formed with a depression, a spring pressed latch pivoted on the shank in position to engage in the said depression of the yoke, and a latch cord connected with said latch, the said cord passing from the latch through the fork of the shank, and returned along the shank, the said shank having guides thereon for the latch cord.

In testimony whereof I have signed my name to this specification in the presence of two subscribing witnesses.

WILLIAM JOHN FRICKE.

Witnesses:
 LILLIAN LEHMAN,
 CHAS. A. SATHER.

Copies of this patent may be obtained for five cents each, by addressing the "Commissioner of Patents, Washington, D. C."